US012693548B2

(12) United States Patent
 Sharma et al.

(10) Patent No.: US 12,693,548 B2
(45) Date of Patent: Jul. 28, 2026

(54) PRESCRIPTION LENSES WITH GRADIENT-INDEX LIQUID CRYSTAL LENS AND PANCHARATNAM-BERRY PHASE LENS

(71) Applicant: Meta Platforms Technologies, LLC, Menlo Park, CA (US)

(72) Inventors: Robin Sharma, Woodinville, WA (US); Carl Chancy, Seattle, WA (US); Afsoon Jamali, Issaquah, WA (US); Kurt Jenkins, Sammamish, WA (US); Yang Zheng, Bothell, WA (US); Rongzhi Huang, Sammamish, WA (US); Timothy Louis Wong, West St. Paul, MN (US); Evan Mark Richards, Phoenix, AZ (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 307 days.

(21) Appl. No.: 18/506,279

(22) Filed: Nov. 10, 2023

(65) Prior Publication Data

US 2024/0184136 A1 Jun. 6, 2024

Related U.S. Application Data

(60) Provisional application No. 63/386,189, filed on Dec. 6, 2022.

(51) Int. Cl.
 *G02C 7/02* (2006.01)
 *G02B 27/00* (2006.01)
 *G02B 27/01* (2006.01)
 *G02C 7/08* (2006.01)

(52) U.S. Cl.
 CPC ......... *G02C 7/027* (2013.01); *G02B 27/0093* (2013.01); *G02B 27/0172* (2013.01); *G02C 7/083* (2013.01); *G02B 2027/0178* (2013.01); *G02C 2202/12* (2013.01)

(58) Field of Classification Search
 CPC ........ G02C 7/027; G02C 7/083; G02C 7/086; G02C 2202/12; G02C 2202/16; G02C 11/10; G02B 27/0093; G02B 27/0172; G02B 2027/0178
 USPC ..................................................... 351/159.74
 See application file for complete search history.

(56) References Cited

U.S. PATENT DOCUMENTS

| | | | | |
|---|---|---|---|---|
| 10,890,776 | B1 * | 1/2021 | Gao ................... | G02B 27/0172 |
| 11,054,622 | B1 * | 7/2021 | Gollier ............... | G02B 27/0172 |
| 2018/0356640 | A1 * | 12/2018 | Yun ..................... | G02B 27/286 |
| 2020/0241305 | A1 * | 7/2020 | Ouderkirk .......... | G02B 17/0804 |
| 2020/0341268 | A1 * | 10/2020 | Amirsolaimani .... | G02B 5/3083 |
| 2021/0223548 | A1 * | 7/2021 | Maimone .............. | G02B 27/48 |
| 2021/0231952 | A1 * | 7/2021 | Jamali ................ | G02B 27/0025 |
| 2021/0286183 | A1 * | 9/2021 | Ouderkirk .......... | G02B 17/0856 |
| 2022/0276507 | A1 * | 9/2022 | Yam ................... | G02B 27/0093 |

* cited by examiner

*Primary Examiner* — William R Alexander
(74) *Attorney, Agent, or Firm* — Greenberg Traurig, LLP

(57) ABSTRACT

An apparatus includes a partial reflector, a first lens, a reflective polarizer, and a second lens. The second lens includes a first part and a second part coupled to the first part with at least one optical property designed to correct a specific user's refractive error. Various other apparatuses, systems, and methods of manufacture are also disclosed.

20 Claims, 9 Drawing Sheets

100

100

105

102

118

120

108

112

104

114

122

106

200

400

500(a)

500(b)

500(c)

600

602

604

606

608

700

704   710

708

702

PRESCRIPTION LENSES WITH GRADIENT-INDEX LIQUID CRYSTAL LENS AND PANCHARATNAM-BERRY PHASE LENS

CROSS REFERENCE TO RELATED APPLICATION

This application claims the benefit of U.S. Provisional Application No. 63/386,189, filed 6 Dec. 2022, the disclosure of which is incorporated, in its entirety, by this reference.

BRIEF DESCRIPTION OF THE DRAWINGS

The accompanying drawings illustrate a number of exemplary embodiments and are a part of the specification. Together with the following description, the drawings demonstrate and explain various principles of the present disclosure.

Figure 1:
FIG. 1 illustrates an example prescription pancake lens according to some embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within this disclosure.

DETAILED DESCRIPTION OF EXEMPLARY EMBODIMENTS

The addition of a prescription component to pancake lenses could create complications due to the lack of space and tight design constraints. To avoid adding air-immersed elements while also minimizing impact on eye-relief, a prescription surface component may be integrated with one of the two principal lenses of the pancake lens (e.g., the lens closer to the eye). Thus, for example, the lens closer to the eye may be produced in two separate parts: a uniform part (e.g., on the display side of the lens) for mass production and a custom prescription surface (e.g., on the eye side of the lens), which may be joined with an optically clear adhesive. In one variation, the optically clear adhesive may extend full across the interior of the lens, leaving no air gap, and, thus, improving optical quality. In another variation, a small amount of optical adhesive may be applied around the circumference of the inner surfaces of the prescription component and the mass-produced component, leaving only a small air gap. In this variation, parts of the pancake lens assembly may be recoverable in case of a manufacturing error.

In addition, integrating the prescription component with one of the principal lenses of the pancake lens may reduce weight, reduce size, increase optical quality, simplify manufacturing processes, provide for user-specific customization, and/or may improve user comfort and/or convenience by enabling a user to wear a head-mounted augmented reality and/or virtual reality device without requiring a design that allows for a user to wear a separate pair of eyeglasses.

As used herein, the term "pancake lens" may generally refer to any optical stack that provides for a folded optical path. In some examples, the folded optical path may allow for a reduction of the volume of the optical stack relative to an apparatus with the same optical properties without a folded path design, thereby enabling a more compact form factor.

FIG. 1 illustrates example pancake lens 100 with embedded accommodation module and an embedded eye tracking module. As shown in FIG. 1, pancake lens 100 may include a lens 102 and a lens 104. In some examples, lens 104 may Pancake lens 100 may also include a beamsplitter 114. In some examples, beamsplitter 114 may be coupled (e.g., as a film) to the display side of lens 102. In addition, pancake lens may include a reflective polarizer 112. In some examples, reflective polarizer 112 may be situated between lens 102 and 104. For example, reflective polarizer 112 may be coupled (e.g., as a film) to the eye side of lens 102.

As will be explained in greater detail below, lens 104 may include several distinct components. For example, lens 104 may include a lens part 108. In some examples, lens may also include one or more integrated modules. For example, pancake lens 100 may include an accommodation module 118 and/or an eye-tracking module 120. In some examples, accommodation module 118 may be planar. For example, accommodation module 118 may be a planar lens, such as a liquid crystal lens. For example, accommodation module 118 may include a gradient-index liquid crystal ("GRIN LC") lens and/or a Pancharatnam-Berry phase ("PBP") lens. Similarly, in some examples, eye-tracking module 120 may be planar. Accommodation module 118 and eye-tracking module 120 may be embedded within (e.g., coupled to the parts of) lens 104 in any suitable manner. For example, accommodation module 118 and/or eye-tracking module 120 may be laminated to and/or bonded with parts of lens 104. In some examples, accommodation module 118 and/or eye-tracking module 120 may be connected to one or more driving circuits (e.g., using flexible cables or other means) that control and/or actuate accommodation module 118 and/or eye-tracking module 120.

Lens 104 may also include a lens part 105. Lens part 105 may be a corrective optical element configured to correct one or more aspects of a user's vision. For example, lens part 105 may be manufactured to the specifications of a specific user's prescription (whereas, e.g., other parts of pancake lens 100 may be manufactured to a specification independent of specific users or their prescriptions).

As can be seen in FIG. 1, a display 106 may produce an image that may be transmitted via pancake lens 100 by way of a folded optical path to an eyebox 120.

In addition, pancake lens 100 may include an eye tracking module 120. In some examples, eye tracking module 120 may be planar. In various examples, eye tracking module 120 may include one or more waveguides, one or more photodiodes, one or more photonic integrated circuits, one or more illumination elements, and/or one or more cameras.

As illustrated in FIG. 1, in some embodiments eye tracking module 120 may be embedded into lens 104. For example, as described above with reference to lens 104 in FIG. 1, and as will be described in greater detail below, lens 104 may be divided into two parts and eye tracking module 120 between the two parts of lens 104. In one example, eye tracking module 120 may be positioned adjacent to an accommodation module 118, also embedded into lens 104. Eye tracking module 120 may be embedded within lens 104 in any suitable manner. For example, eye tracking module 120 may be laminated to and/or bonded with accommodation module 118, forming a compound module. The compound module containing may be laminated to and/or bonded with parts of lens 104. In some examples, eye tracking module 120 may be connected to a driving circuit (e.g., using flexible cables or other means) that controls and/or actuates the eye tracking capabilities of eye tracking module 120.

Figure 2:
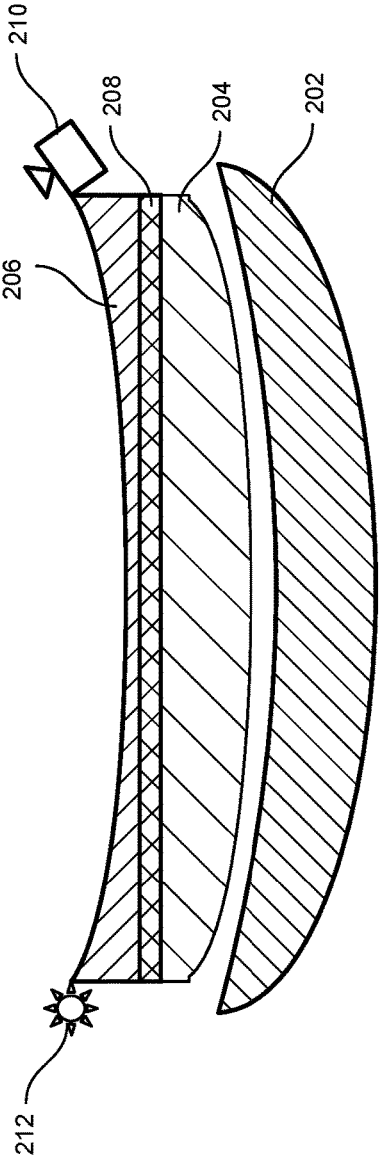
FIG. 2 illustrates an example prescription pancake lens according to some embodiments.
Figure 2:
Figure 2:
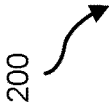

FIG. 2 illustrates an example prescription pancake lens 200. As shown in FIG. 2, lens 200 may include a stack of elements, including, e.g., a lens 202, a lens part 204, a prescription lens part 206, and an optically clear adhesive 208 coupling lens part 204 and prescription lens part 206. As shown in FIG. 2, prescription pancake lens 200 may have four or fewer air-immersed surfaces (e.g., the front and back surfaces of lens 202, the front surface of lens part 204, and the rear surface of prescription lens part 206).

Furthermore, prescription pancake lens 200 may have approximately the same eye relief as a non-prescription pancake lens with an otherwise corresponding design. In comparison, a non-prescription pancake lens used in tandem with a prescription lens for vision correction may increase the eye relief of the non-prescription pancake lens.

In addition, as may be appreciated, an eye-tracking illumination source 212 and an eye-tracking camera 210 may, in some examples, have a direct line of sight with a user's eye rather than, e.g., being interrupted by a separate prescription lens.

Figure 3:
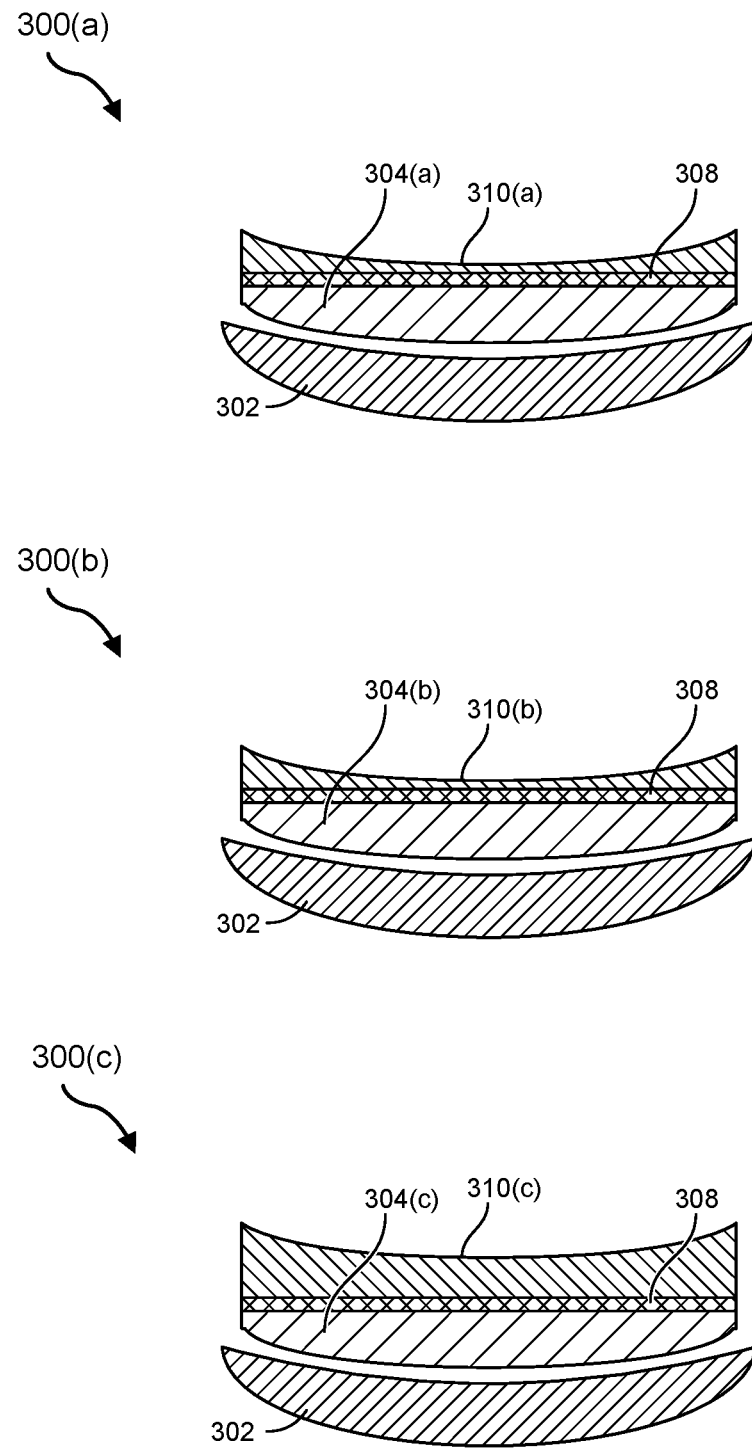
FIG. 3 illustrates prescription pancake lens designs with various arrangements of prescription components according to certain embodiments.

FIG. 3 illustrates prescription pancake lens designs 300 (a)-(c) with various arrangements of prescription components. As shown in FIG. 3, a lens design 300(a) may include a non-prescription lens 302(a), a non-prescription lens part 304(a), an optically clear adhesive 308, and a prescription lens part 310(a). Thus, for example, the eye-side surface of lens part 310(a) may be custom-shaped for a user's prescription, while lens part 304(a) may be generically shaped—e.g., independent of a specific user's prescription.

Lens design 300(b) may include non-prescription lens 302(a), a prescription lens part 304(b), optically clear adhesive 308, and a non-prescription lens part 310(b). Thus, for example, the world- or display-side surface of lens part 304(b) may be custom-shaped for a user's prescription, while lens part 310(b) may be generically shaped.

Lens design 300(c) may include non-prescription lens 302(a), a prescription lens part 304(c), optically clear adhesive 308, and a prescription lens part 310(c). Thus, for example, the eye-side surface of lens part 310(c) may be custom-shaped for a user's prescription, and the world- or display-side surface of lens part 304(c) may also be custom-shaped for the user's prescription.

Prescription lens parts described herein may be manufactured and/or assembled into a pancake lens in any suitable manner. For example, prescription lens parts described herein may be directly laminated and/or additively printed (e.g., "3D printed") to another (e.g., non-prescription, generic) lens part. In some examples, prescription lens parts may be molded and/or fabricated separately (e.g., using a diamond turning process) and then laminated to another (e.g., non-prescription, generic) lens part.

Figure 4:
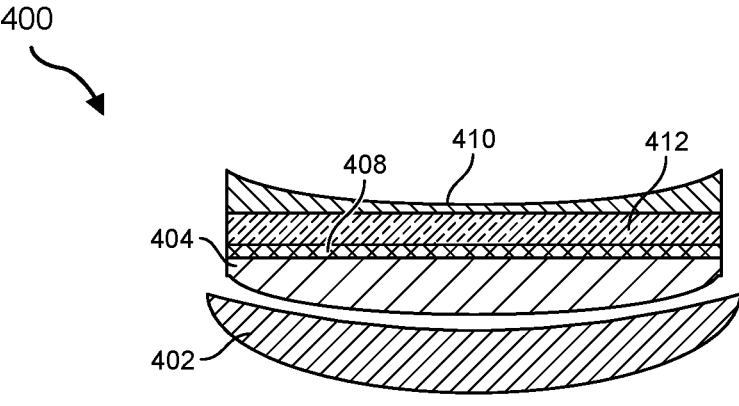
FIG. 4 illustrates an example prescription pancake lens design with an additional substrate according to certain embodiments.

FIG. 4 illustrates a prescription pancake lens design 400. As shown in FIG. 4, a lens design 400 may include a non-prescription lens 402, a non-prescription lens part 404, an optically clear adhesive 408, a prescription lens part 410, and a substrate 412. Substrate 412 may include any suitable material. For example, substrate 412 may include glass and/or a polymer. In some examples, substrate 412 may weigh less by volume that the material of prescription lens part 410. Additionally or alternatively, substrate 412 couple to lens part 404 in place of prescription lens part 410 directly coupling to lens part 404, allowing prescription lens part 404 to be thinner and/or more light-weight.

Figure 5:
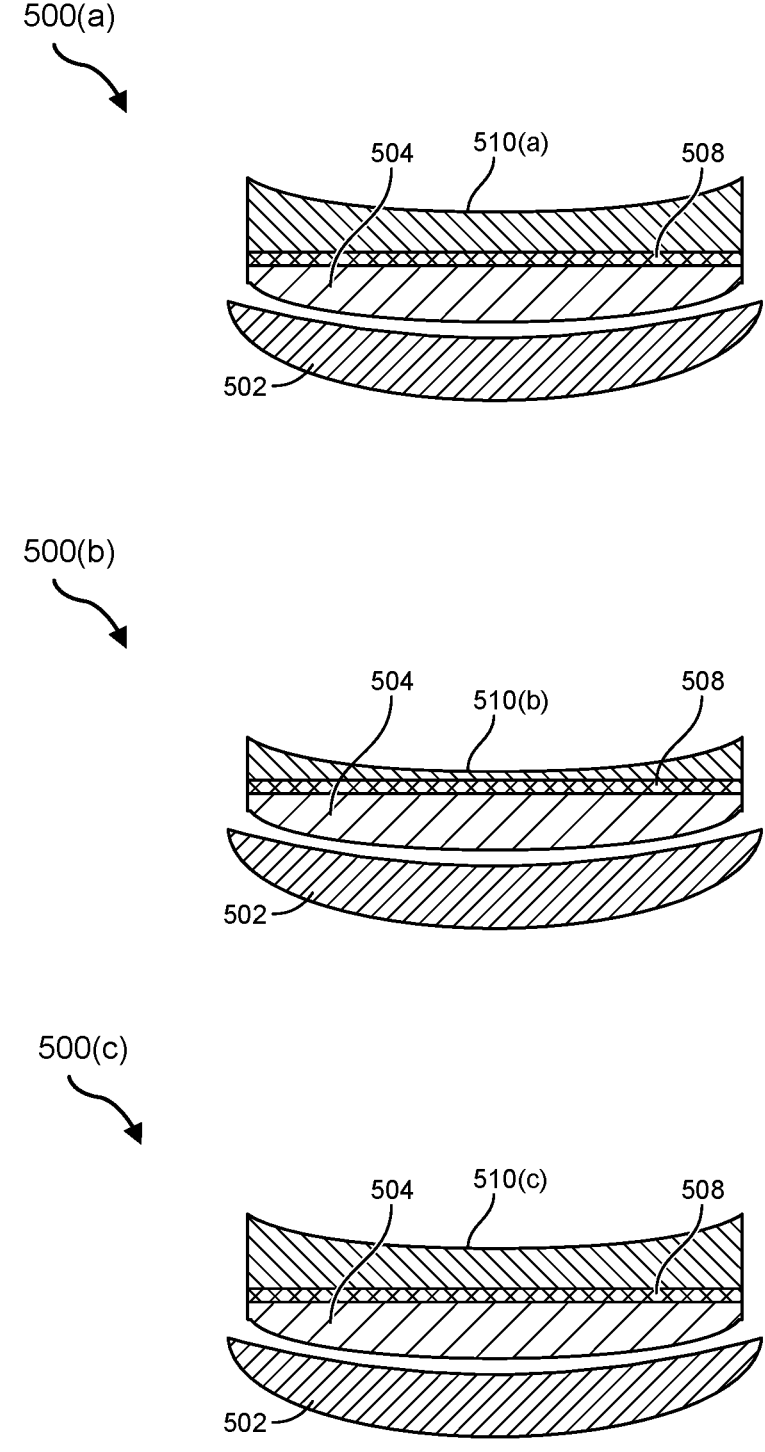
FIG. 5 illustrates prescription pancake lens designs with various prescription component configurations according to certain embodiments.

FIG. 5 illustrates prescription pancake lens designs 500 (a)-(c) with various prescription component configurations according to certain embodiments. As shown in FIG. 5, a lens design 500(a) may include a non-prescription lens 502, a non-prescription lens part 504, an optically clear adhesive 308, and a prescription lens part 510(a). In one example, prescription lens part 510(a) may be optically index-matched to other parts of lens design 500(a) (e.g., optically clear adhesive 508 and non-prescription lens part 504). In addition, in one example, prescription lens part 510(a) may be diamond turned.

Lens design 500(b) may include, in place of prescription lens part 510(a), a prescription lens part 510(b). Prescription lens part 510(b) may be made of a higher-index material than other parts of lens design 500(b) (e.g., optically clear adhesive 508 and/or non-prescription lens part 504). Prescription lens part 510(b) may thus be thinner than prescription lens part 510(a). In on example, prescription lens part 510(b) may be diamond turned.

Lens design 500(c) may include, in place of prescription lens parts 510(a) or 510(b), a prescription lens part 510(c). Prescription lens part 510(c) may be optically index-matched to other parts of lens design 500(c) (e.g., optically clear adhesive 508 and non-prescription lens part 504). In addition, in one example, prescription lens part 510(c) may be additively printed (e.g., "3D printed").

Figure 6:
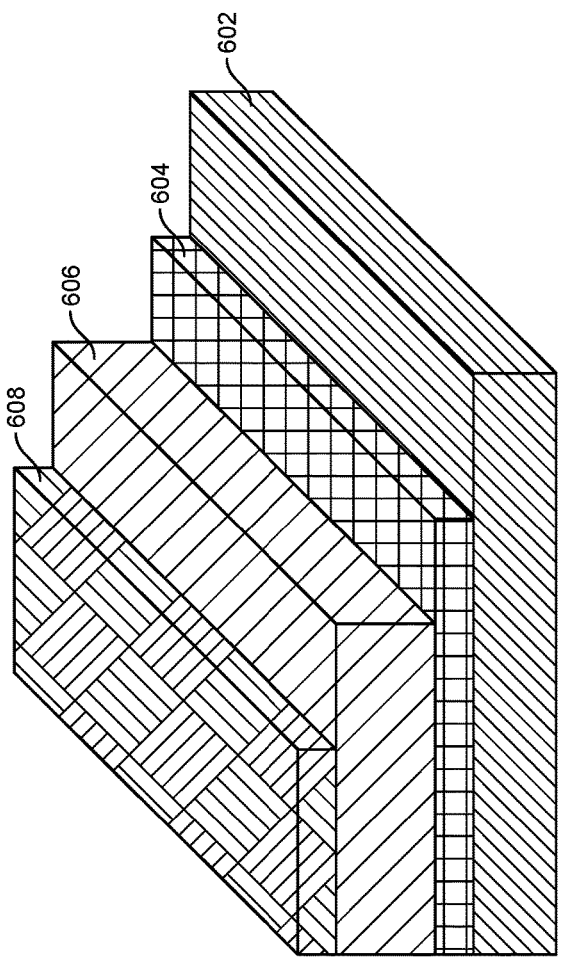
FIG. 6 illustrates an example optically clear adhesive according to some embodiments.

FIG. 6 illustrates an example optically clear adhesive stack 600. As shown in FIG. 6, adhesive stack 600 may include a release liner 602. In one example, release liner 602 may include a polymer material. For example, release liner 602 may include polyethylene terephthalate. Release liner 602 may be of any suitable thickness. For example, release liner 602 may be between 5 and 100 microns, between 5 and 50 microns, between 5 and 30 microns, between 10 and 30 microns, and/or between 15 and 25 microns.

Adhesive stack 600 may also include an adhesive layer 604. In one example, adhesive layer 604 may include a polymer material. For example, adhesive layer 604 may include an acrylic adhesive material. Adhesive layer 604 may be of any suitable thickness. For example, release liner 602 may be between 5 and 50 microns, between 5 and 30 microns, between 5 and 20 microns, and/or between 10 and 20 microns.

Adhesive stack 600 may also include a layer 606. In one example, layer 606 may include a polymer. For example, layer 606 may include polyethylene terephthalate. Generally, layer 606 may include any suitable material. For example, layer 606 may include glass or one or more stiffer materials. Layer 606 may be of any suitable thickness. For example, Layer 606 may be between 5 and 200 microns, between 10 and 150 microns, between 50 and 125 microns, between 80 and 120 microns, and/or between 90 and 110 microns.

In addition, adhesive stack 600 may include an anti-oligomer layer 608.

In some examples, adhesive stack 600 may aid in replacing a prescription lens part (such as one or more of the prescription lens parts illustrated in FIGS. 1-5). For example, the adhesion provided in optical stack 600 may reduce when exposed to radiation at a specific wavelength (e.g., a specific wavelength of ultraviolet radiation). Thus, a prescription pancake lens described herein may allow for a prescription to be updated by removing and replacing a prescription lens part.

Figure 7:
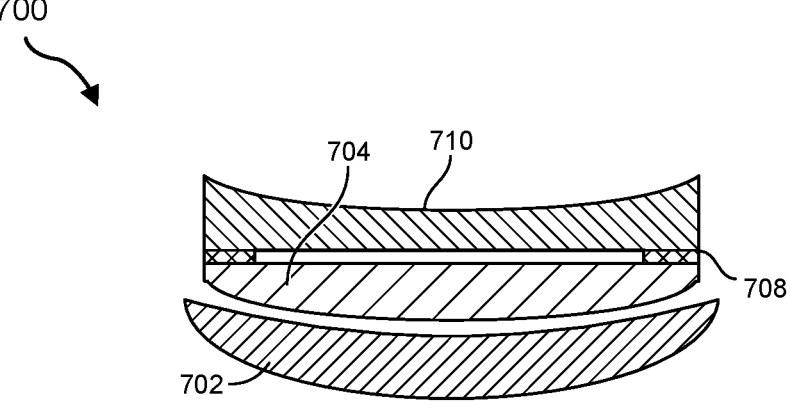
FIG. 7 illustrates prescription pancake designs with optically clear adhesive applied at the periphery of component lenses according to some embodiments.

FIG. 7 illustrates an example prescription pancake design 700 with optically clear adhesive applied at the periphery of component lens parts. As shown in FIG. 7, a lens design 700 may include a non-prescription lens 702, a non-prescription lens part 704, an optically clear adhesive 708, and a prescription lens part 710. As shown in FIG. 7, optically clear adhesive 708 may be present at the periphery of lens part 710 (and lens part 704), but not in the center. In this manner, lens part 710 may be more easily detached (and replaced)— e.g., if a user's prescription is updated. Any suitable proportion of lens part 710 may be free of adhesive 708. For example, lens part 710 may be free of adhesive 708 within at least 50% of the inner radius of lens part 710, within at least 60% of the inner radius, within at least 70% of the inner radius, within at least 80% of the inner radius, within at least 90% of the inner radius, within at least 95% of the inner radius, within at least 98% of the inner radius, or within at least 99% of the inner radius.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 800 in FIG. 8) or that visually immerses a user in an artificial reality (such as, e.g., virtual-reality system 900 in FIG. 9). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 8:
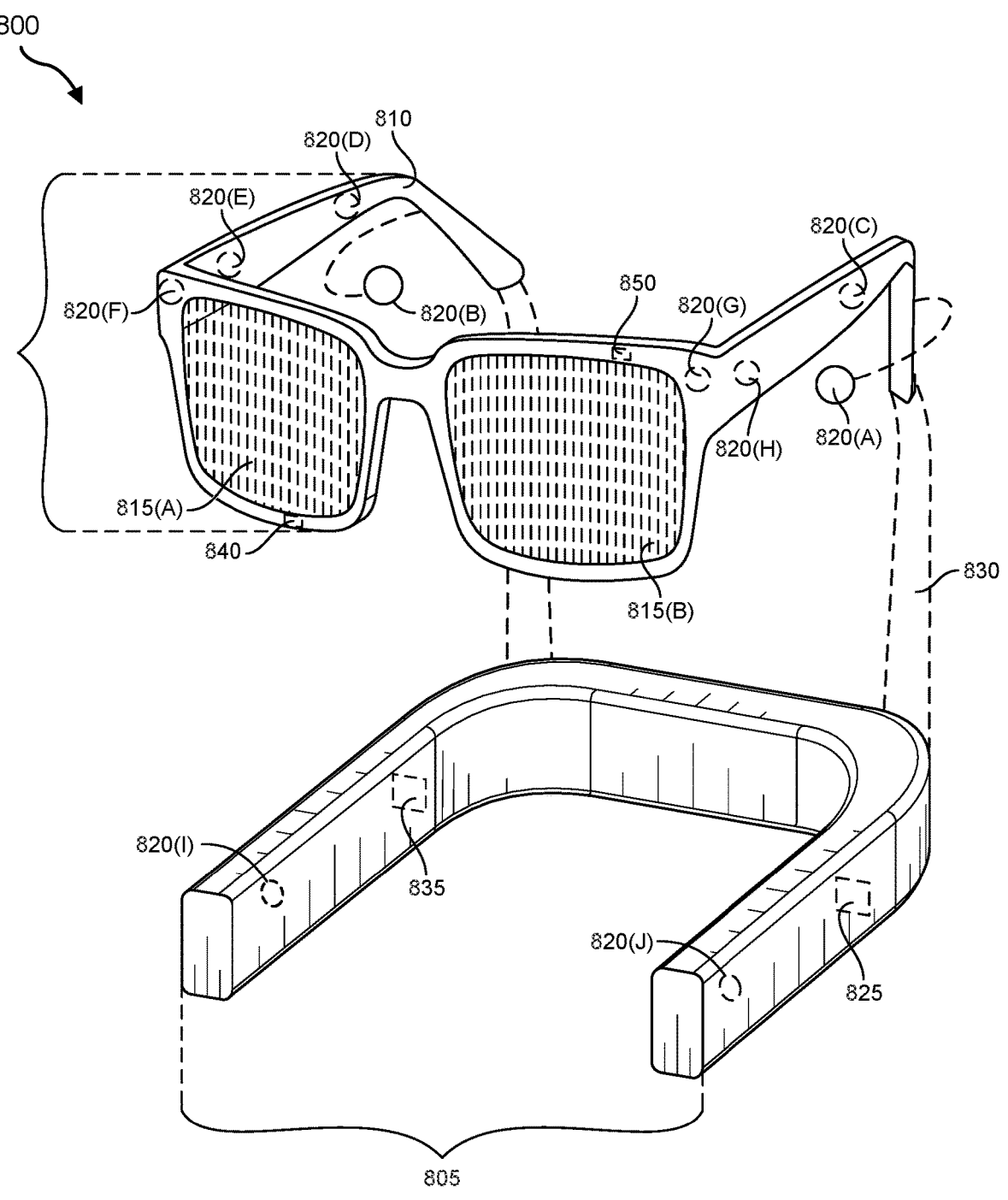
FIG. 8 is an illustration of exemplary augmented-reality glasses that may be used in connection with embodiments of this disclosure.
Figure 9:
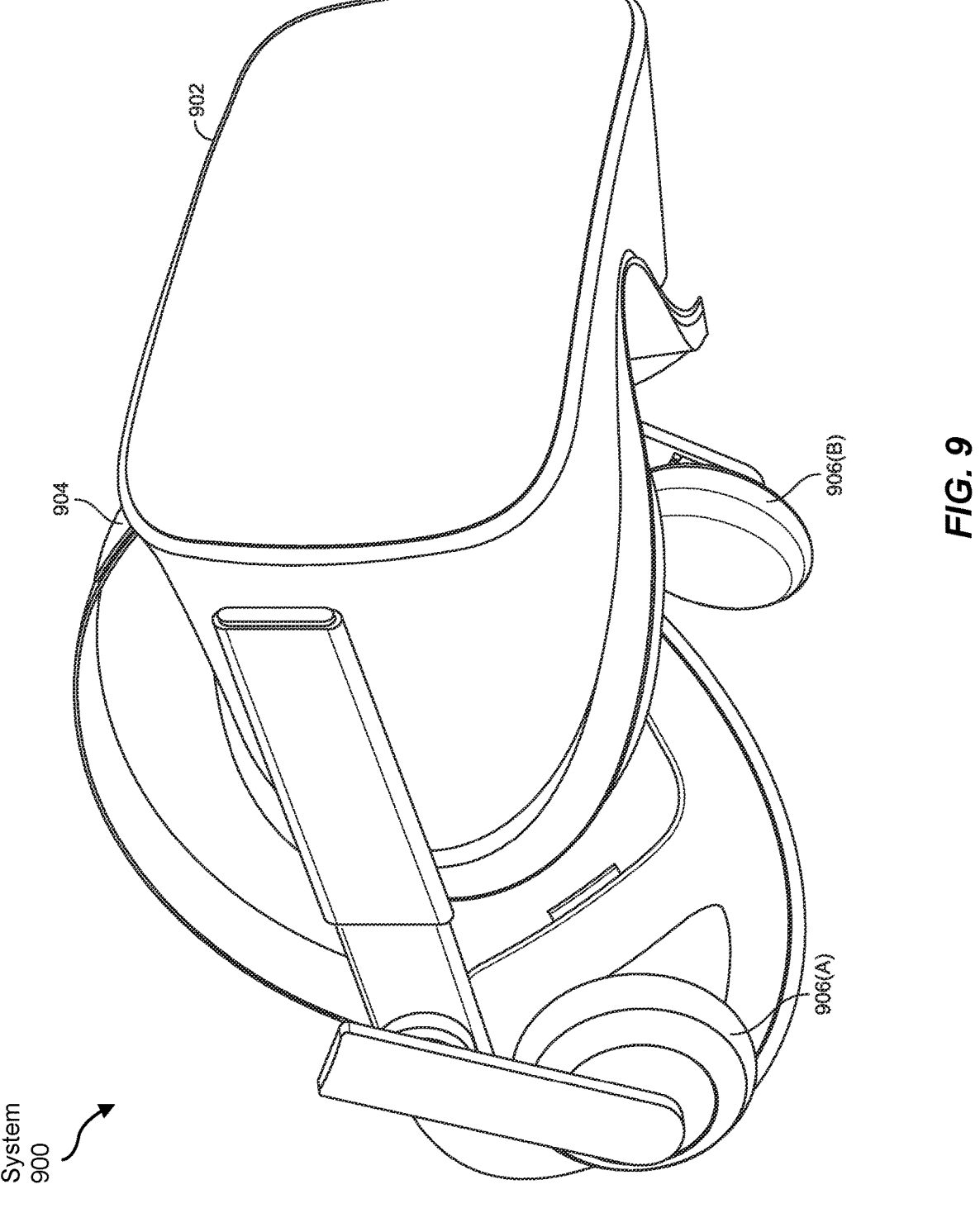
FIG. 9 is an illustration of an exemplary virtual-reality headset that may be used in connection with embodiments of this disclosure.

Turning to FIG. 8, augmented-reality system 800 may include an eyewear device 802 with a frame 810 configured to hold a left display device 815(A) and a right display device 815(B) in front of a user's eyes. Display devices 815(A) and 815(B) may act together or independently to present an image or series of images to a user. While augmented-reality system 800 includes two displays, embodiments of this disclosure may be implemented in augmented-reality systems with a single NED or more than two NEDs.

In some embodiments, augmented-reality system 800 may include one or more sensors, such as sensor 840. Sensor 840 may generate measurement signals in response to motion of augmented-reality system 800 and may be located on substantially any portion of frame 810. Sensor 840 may represent one or more of a variety of different sensing mechanisms, such as a position sensor, an inertial measurement unit (IMU), a depth camera assembly, a structured light emitter and/or detector, or any combination thereof. In some embodiments, augmented-reality system 800 may or may not include sensor 840 or may include more than one sensor. In embodiments in which sensor 840 includes an IMU, the IMU may generate calibration data based on measurement signals from sensor 840. Examples of sensor 840 may include, without limitation, accelerometers, gyroscopes, magnetometers, other suitable types of sensors that detect motion, sensors used for error correction of the IMU, or some combination thereof.

In some examples, augmented-reality system 800 may also include a microphone array with a plurality of acoustic transducers 820(A)-820(J), referred to collectively as acoustic transducers 820. Acoustic transducers 820 may represent transducers that detect air pressure variations induced by sound waves. Each acoustic transducer 820 may be configured to detect sound and convert the detected sound into an electronic format (e.g., an analog or digital format). The microphone array in FIG. 8 may include, for example, ten acoustic transducers: 820(A) and 820(B), which may be designed to be placed inside a corresponding ear of the user, acoustic transducers 820(C), 820(D), 820(E), 820(F), 820(G), and 820(H), which may be positioned at various locations on frame 810, and/or acoustic transducers 820(I) and 820(J), which may be positioned on a corresponding neckband 805.

In some embodiments, one or more of acoustic transducers 820(A)-(J) may be used as output transducers (e.g., speakers). For example, acoustic transducers 820(A) and/or 820(B) may be earbuds or any other suitable type of headphone or speaker.

The configuration of acoustic transducers 820 of the microphone array may vary. While augmented-reality system 800 is shown in FIG. 8 as having ten acoustic transducers 820, the number of acoustic transducers 820 may be greater or less than ten. In some embodiments, using higher numbers of acoustic transducers 820 may increase the amount of audio information collected and/or the sensitivity and accuracy of the audio information. In contrast, using a lower number of acoustic transducers 820 may decrease the computing power required by an associated controller 850 to process the collected audio information. In addition, the position of each acoustic transducer 820 of the microphone array may vary. For example, the position of an acoustic transducer 820 may include a defined position on the user, a defined coordinate on frame 810, an orientation associated with each acoustic transducer 820, or some combination thereof.

Acoustic transducers 820(A) and 820(B) may be positioned on different parts of the user's ear, such as behind the pinna, behind the tragus, and/or within the auricle or fossa. Or, there may be additional acoustic transducers 820 on or surrounding the ear in addition to acoustic transducers 820 inside the ear canal. Having an acoustic transducer 820 positioned next to an ear canal of a user may enable the microphone array to collect information on how sounds arrive at the ear canal. By positioning at least two of acoustic transducers 820 on either side of a user's head (e.g., as binaural microphones), augmented-reality device 800 may simulate binaural hearing and capture a 3D stereo sound field around about a user's head. In some embodiments, acoustic transducers 820(A) and 820(B) may be connected to augmented-reality system 800 via a wired connection 830, and in other embodiments acoustic transducers 820(A) and 820(B) may be connected to augmented-reality system 800 via a wireless connection (e.g., a BLUETOOTH connection). In still other embodiments, acoustic transducers 820(A) and 820(B) may not be used at all in conjunction with augmented-reality system 800.

Acoustic transducers 820 on frame 810 may be positioned in a variety of different ways, including along the length of the temples, across the bridge, above or below display devices 815(A) and 815(B), or some combination thereof. Acoustic transducers 820 may also be oriented such that the microphone array is able to detect sounds in a wide range of directions surrounding the user wearing the augmented-reality system 800. In some embodiments, an optimization process may be performed during manufacturing of augmented-reality system 800 to determine relative positioning of each acoustic transducer 820 in the microphone array.

In some examples, augmented-reality system 800 may include or be connected to an external device (e.g., a paired device), such as neckband 805. Neckband 805 generally represents any type or form of paired device. Thus, the following discussion of neckband 805 may also apply to various other paired devices, such as charging cases, smart watches, smart phones, wrist bands, other wearable devices, hand-held controllers, tablet computers, laptop computers, other external compute devices, etc.

As shown, neckband 805 may be coupled to eyewear device 802 via one or more connectors. The connectors may be wired or wireless and may include electrical and/or non-electrical (e.g., structural) components. In some cases, eyewear device 802 and neckband 805 may operate independently without any wired or wireless connection between them. While FIG. 8 illustrates the components of eyewear device 802 and neckband 805 in example locations on eyewear device 802 and neckband 805, the components may be located elsewhere and/or distributed differently on eyewear device 802 and/or neckband 805. In some embodiments, the components of eyewear device 802 and neckband 805 may be located on one or more additional peripheral devices paired with eyewear device 802, neckband 805, or some combination thereof.

Pairing external devices, such as neckband 805, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 800 may be provided by a paired device or shared between a paired device and an eyewear device, thus reducing the weight, heat profile, and form factor of the eyewear device overall while still retaining desired functionality. For example, neckband 805 may allow components that would otherwise be included on an eyewear device to be included in neckband 805 since users may tolerate a heavier weight load on their shoulders than they would tolerate on their heads. Neckband 805 may also have a larger surface area over which to diffuse and disperse heat to the ambient environment. Thus, neckband 805 may allow for greater battery and computation capacity than might otherwise have been possible on a stand-alone eyewear device. Since weight carried in neckband 805 may be less invasive to a user than weight carried in eyewear device 802, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 805 may be communicatively coupled with eyewear device 802 and/or to other devices. These other devices may provide certain functions (e.g., tracking, localizing, depth mapping, processing, storage, etc.) to augmented-reality system 800. In the embodiment of FIG. 8, neckband 805 may include two acoustic transducers (e.g., 820(*l*) and 820(J)) that are part of the microphone array (or potentially form their own microphone subarray). Neckband 805 may also include a controller 825 and a power source 835.

Acoustic transducers 820(*l*) and 820(J) of neckband 805 may be configured to detect sound and convert the detected sound into an electronic format (analog or digital). In the embodiment of FIG. 8, acoustic transducers 820(1) and 820(J) may be positioned on neckband 805, thereby increasing the distance between the neckband acoustic transducers 820(1) and 820(J) and other acoustic transducers 820 positioned on eyewear device 802. In some cases, increasing the distance between acoustic transducers 820 of the microphone array may improve the accuracy of beamforming performed via the microphone array. For example, if a sound is detected by acoustic transducers 820(C) and 820(D) and the distance between acoustic transducers 820(C) and 820 (D) is greater than, e.g., the distance between acoustic transducers 820(D) and 820(E), the determined source location of the detected sound may be more accurate than if the sound had been detected by acoustic transducers 820(D) and 820(E).

Controller 825 of neckband 805 may process information generated by the sensors on neckband 805 and/or augmented-reality system 800. For example, controller 825 may process information from the microphone array that describes sounds detected by the microphone array. For each detected sound, controller 825 may perform a direction-of-arrival (DOA) estimation to estimate a direction from which the detected sound arrived at the microphone array. As the microphone array detects sounds, controller 825 may populate an audio data set with the information. In embodiments in which augmented-reality system 800 includes an inertial measurement unit, controller 825 may compute all inertial and spatial calculations from the IMU located on eyewear device 802. A connector may convey information between augmented-reality system 800 and neckband 805 and between augmented-reality system 800 and controller 825. The information may be in the form of optical data, electrical data, wireless data, or any other transmittable data form. Moving the processing of information generated by augmented-reality system 800 to neckband 805 may reduce weight and heat in eyewear device 802, making it more comfortable to the user.

Power source 835 in neckband 805 may provide power to eyewear device 802 and/or to neckband 805. Power source 835 may include, without limitation, lithium ion batteries, lithium-polymer batteries, primary lithium batteries, alkaline batteries, or any other form of power storage. In some cases, power source 835 may be a wired power source. Including power source 835 on neckband 805 instead of on eyewear device 802 may help better distribute the weight and heat generated by power source 835.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 900 in FIG. 9, that mostly or completely covers a user's field of view. Virtual-reality system 900 may include a front rigid body 902 and a band 904 shaped to fit around a user's head. Virtual-reality system 900 may also include output audio transducers 906(A) and 906(B). Furthermore, while not shown in FIG. 9, front rigid body 902 may include one or more electronic elements, including one or more electronic displays, one or more inertial measurement units (IMUs), one or more tracking emitters or detectors, and/or any other suitable device or system for creating an artificial-reality experience.

Artificial-reality systems may include a variety of types of visual feedback mechanisms. For example, display devices in augmented-reality system 800 and/or virtual-reality system 900 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 800 and/or virtual-reality system 900 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 800 and/or virtual-reality system 900 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to any claims appended hereto and their equivalents in determining the scope of the present disclosure.

Unless otherwise noted, the terms "connected to" and "coupled to" (and their derivatives), as used in the specification and/or claims, are to be construed as permitting both direct and indirect (i.e., via other elements or components) connection. In addition, the terms "a" or "an," as used in the specification and/or claims, are to be construed as meaning "at least one of." Finally, for ease of use, the terms "including" and "having" (and their derivatives), as used in the specification and/or claims, are interchangeable with and have the same meaning as the word "comprising."

The invention claimed is:

1. An apparatus comprising:
a beamsplitter;
a first lens;
a reflective polarizer; and
a second lens configured on an eye side with respect to the first lens, wherein the second lens comprises:
a first part;
a second part coupled to the first part with at least one optical property designed to correct a specific user's refractive error.

2. The apparatus of claim 1, wherein the second lens further comprises an accommodation module embedded between the first part of the second lens and the second part of the second lens.

3. The apparatus of claim 2, wherein the accommodation module comprises at least one of:
a gradient-index liquid crystal lens or
a Pancharatnam-Berry phase lens.

4. The apparatus of claim 1, wherein the second lens further comprising an eye-tracking module embedded between to the first part of the second lens and the second part of the second lens.

5. The apparatus of claim 1, wherein:
the first part of the second lens is on a world side of the second lens; and
the second part of the second lens is on the eye side of the second lens.

6. The apparatus of claim 1, wherein:
the first part of the second lens is on the eye side of the second lens; and
the second part of the second lens is on a world side of the second lens.

7. The apparatus of claim 1, wherein:
the second part of the second lens has at least one optical property designed to correct the specific user's refractive error.

8. The apparatus of claim 1, further comprising a substrate layer coupled to the second part of the second lens.

9. The apparatus of claim 1, wherein:
the second part of the second lens is optically index-matched to the first part of the second lens; and
the second part of the second lens is diamond turned.

10. The apparatus of claim 1, wherein:
the second part of the second lens comprises a higher-index material than the first part of the second lens; and
the second part of the second lens is diamond turned.

11. The apparatus of claim 1, wherein:
the second part of the second lens is optically index-matched to the first part of the second lens; and
the second part of the second lens is additively printed.

12. The apparatus of claim 1, further comprising an optically clear adhesive stack that couples of the second part of the second lens to the first part of the second lens.

13. The apparatus of claim 12, wherein adhesion provided by the optically clear adhesive stack reduces when exposed to radiation at a predetermined wavelength.

14. The apparatus of claim 13, wherein the predetermined wavelength comprises an ultraviolet wavelength.

15. The apparatus of claim 1, further comprising an optically clear adhesive that couples the second part of the second lens to the first part of the second lens.

16. The apparatus of claim 15, wherein the optically clear adhesive is adjacent to a periphery of the second part of the second lens and not adjacent to a center of the second part of the second lens.

17. A system comprising:
a head-mounted display;
an optical stack configured to transmit images produced by the head-mounted display to an eyebox, the optical stack comprising:
a beamsplitter;
a first lens;
a reflective polarizer; and
a second lens configured on an eye side with respect to the first lens, wherein the second lens comprises:
a first part;
a second part coupled to the first part with at least one optical property designed to correct a specific user's refractive error.

18. The system of claim 17, wherein the second lens further comprises an accommodation module embedded between the first part of the second lens and the second part of the second lens.

19. The system of claim 18, wherein the accommodation module comprises at least one of:
a gradient-index liquid crystal lens or
a Pancharatnam-Berry phase lens.

20. A method of manufacture comprising:
creating a second lens by coupling a first part to a second part, the second part having at least one optical property designed to correct a specific user's refractive error; and
aligning a partial reflector, a first lens, a reflective polarizer, and the second lens to form an optical stack that results in a folded optical path when aligned with a display, wherein the second is configured on an eye side with respect to the first lens.

* * * * *